US012646972B2

(12) United States Patent
Hashimoto et al.

(10) Patent No.: US 12,646,972 B2
(45) Date of Patent: Jun. 2, 2026

(54) GROUND POWER SUPPLY DEVICE, MOVING BODY, AND ABNORMALITY DETERMINATION DEVICE

(71) Applicant: TOYOTA JIDOSHA KABUSHIKI KAISHA, Aichi-ken (JP)

(72) Inventors: Toshiya Hashimoto, Miyoshi (JP); Daiki Yokoyama, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 513 days.

(21) Appl. No.: 18/310,543

(22) Filed: May 2, 2023

(65) Prior Publication Data

US 2023/0412000 A1 Dec. 21, 2023

(30) Foreign Application Priority Data

Jun. 16, 2022 (JP) ................................. 2022-097335

(51) Int. Cl.
*H02J 50/10* (2016.01)
(52) U.S. Cl.
CPC .................................... *H02J 50/10* (2016.02)
(58) Field of Classification Search
CPC ............ B60L 3/00; B60L 3/0023; H02J 50/10
See application file for complete search history.

(56) References Cited

FOREIGN PATENT DOCUMENTS

| JP | 2010-167898 A | | 8/2010 |
|----|---------------|---|--------|
| JP | 2015002658 A | * | 1/2015 |

* cited by examiner

*Primary Examiner* — Robert J McCarry, Jr.
(74) *Attorney, Agent, or Firm* — HAUPTMAN HAM, LLP

(57) ABSTRACT

A ground power supply device includes a power transmission device, a ground-side communication device, and a power transmission control device. The power transmission device performs contactless power supply to a moving body including a power reception device. The ground-side communication device communicates directly or indirectly with the moving body. The power transmission control device is configured to: count the number of times a power transfer abnormality has occurred between the power transmission device and the power reception device or the number of times an abnormality occurrence notification that is sent from the moving body when the power transfer abnormality is detected in the moving body; and determine that there is an abnormality in the power transmission device when the number of times the power transfer abnormality has occurred or the number of times the abnormality occurrence notification has been received becomes equal to or greater than a predetermined value.

17 Claims, 10 Drawing Sheets

START

S111
HAS ABNORMALITY OCCURRENCE
NOTIFICATION BEEN RECEIVED
FROM GROUND POWER SUPPLY DEVICE? — NO

YES

S112
$N_R \leftarrow N_R + 1$

S113
$N_R \geq TH2$ ? — NO

YES

S114
DETERMINE THAT THERE
IS ABNORMALITY IN POWER
RECEPTION DEVICE

S115
$N_R \leftarrow 0$

S116
SEND VEHICLE-SIDE
ABNORMALITY NOTIFICATION
TO GROUND POWER
SUPPLY DEVICE

END

FIG. 6

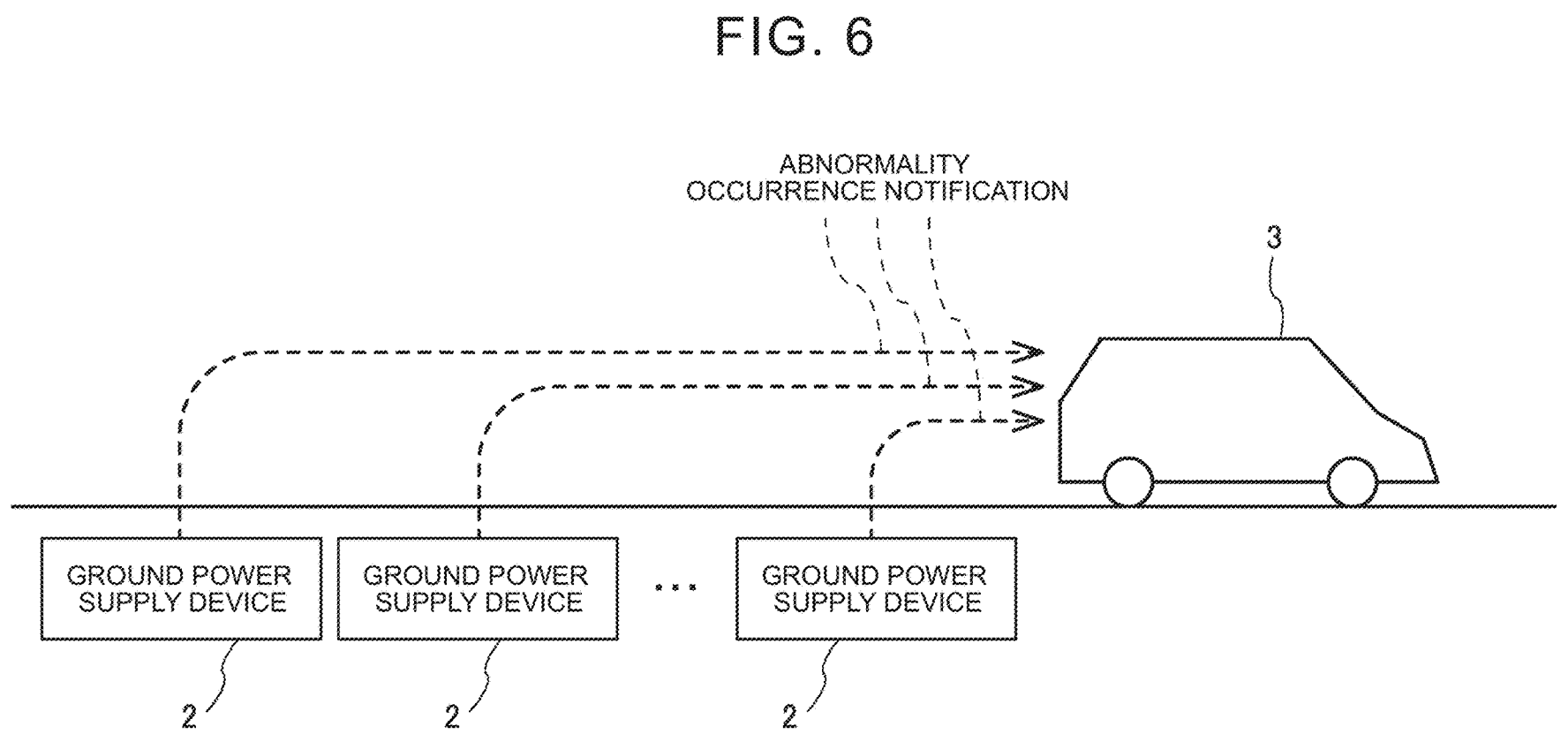

ABNORMALITY
OCCURRENCE NOTIFICATION

3

GROUND POWER
SUPPLY DEVICE

2

GROUND POWER
SUPPLY DEVICE

2

GROUND POWER
SUPPLY DEVICE

2

GROUND POWER SUPPLY DEVICE, MOVING BODY, AND ABNORMALITY DETERMINATION DEVICE

CROSS-REFERENCE TO RELATED APPLICATION

This application claims priority to Japanese Patent Application No. 2022-097335 filed on Jun. 16, 2022 incorporated herein by reference in its entirety.

BACKGROUND

1. Technical Field

The present disclosure relates to ground power supply devices, moving bodies, and abnormality determination devices.

2. Description of Related Art

Japanese Unexamined Patent Application Publication No. 2010-167898 (JP 2010-167898 A) discloses, as a conventional contactless power supply system, a system configured to contactlessly supply electric power from a power transmission device installed in a road to a power reception device mounted on a vehicle.

SUMMARY

When an abnormality occurs in power transfer between a power transmission device and a power reception device in a contactless power supply system, it is necessary to determine whether the cause of the abnormality lies in the power transmission device or in the power reception device.

The present disclosure provides a technique of, when an abnormality related to power transfer occurs between a power transmission device and a power reception device, determining whether the cause of the abnormality lies in the power transmission device or in the power reception device.

A first aspect of the present disclosure relates to a ground power supply device including a power transmission device, a ground side-communication device, and a power transmission control device. The power transmission device is configured to perform contactless power supply to a moving body including a power reception device. The ground-side communication device is configured to communicate directly or indirectly with the moving body. The power transmission control device is configured to count the number of times a power transfer abnormality has occurred between the power transmission device and the power reception device or the number of times an abnormality occurrence notification has been received, the abnormality occurrence notification being a notification that is sent from the moving body when the power transfer abnormality is detected in the moving body. The power transmission control device is configured to determine that there is an abnormality in the power transmission device when the number of times the power transfer abnormality has occurred or the number of times the abnormality occurrence notification has been received becomes equal to or greater than a predetermined value.

In the ground power supply device of the first aspect, the power transmission control device may be configured as follows. The power transmission control device may be configured to: (i) determine whether the power transfer abnormality has occurred; (ii) when the power transfer abnormality has occurred, send the abnormality occurrence notification to the moving body equipped with the power reception device involved in the power transfer abnormality that has occurred with the power transmission device; and (iii) when a moving body-side abnormality notification is received from the moving body to which the abnormality occurrence notification has been sent, decrement the counted number of times the power transfer abnormality has occurred, the moving body-side abnormality notification being a notification that there is an abnormality in the power reception device mounted on the moving body.

In the ground power supply device of the first aspect, the power transmission control device may be configured to decrement the counted number of times the abnormality occurrence notification has been received, when a moving body-side abnormality notification is received from the moving body that has sent the abnormality occurrence notification, the moving body-side abnormality notification being a notification that there is an abnormality in the power reception device mounted on the moving body.

A second aspect of the present disclosure relates to a moving body including a power reception device, a moving body-side communication device, and a power reception control device. The power reception device is configured to receive contactless power supply from a power transmission device of a ground power supply device. The moving body-side communication device is configured to communicate directly or indirectly with the ground power supply device. The power reception control device is configured to count the number of times a power transfer abnormality has occurred between the power transmission device and the power reception device or the number of times an abnormality occurrence notification has been received, the abnormality occurrence notification being a notification that is sent from the ground power supply device when the power transfer abnormality is detected in the ground power supply device. The power reception control device is configured to determine that there is an abnormality in the power reception device when the number of times the power transfer abnormality has occurred or the number of times the abnormality occurrence notification has been received becomes equal to or greater than a predetermined value.

In the moving body of the second aspect, the power reception control device may be configured as follows. The power reception control device may be configured to: (i) determine whether the power transfer abnormality has occurred; (ii) when the power transfer abnormality has occurred, send the abnormality occurrence notification to the ground power supply device including the power transmission device involved in the power transfer abnormality that has occurred with the power reception device; and (iii) when a ground-side abnormality notification is received from the ground power supply device to which the abnormality occurrence notification has been sent, decrement the counted number of times the power transfer abnormality has occurred, the ground-side abnormality notification being a notification that there is an abnormality in the power transmission device of the ground power supply device.

In the moving body of the second aspect, the power reception control device may be configured to decrement the counted number of times the abnormality occurrence notification has been received, when a ground-side abnormality notification is received from the ground power supply device that has sent the abnormality occurrence notification, the ground-side abnormality notification being a notification that there is an abnormality in the power transmission device of the ground power supply device.

A third aspect of the present disclosure relates to an abnormality determination device in a power transmission device of a contactless power supply system. The abnormality determination device is configured to: (i) count the number of times an abnormality related to power transfer has occurred between the power transmission device and a power reception device configured to contactlessly receive electric power transmitted from the power transmission device or the number of times a notification that the power transfer abnormality related to power transfer has occurred has been received from outside; and (ii) determine that there is an abnormality in the power transmission device when the counted number of times becomes equal to or greater than a predetermined value.

A fourth aspect of the present disclosure relates to an abnormality determination method for a power transmission device of a contactless power supply system. The abnormality determination method for the power transmission device includes: (i) counting the number of times a power transfer abnormality has occurred between the power transmission device and a power reception device configured to contactlessly receive electric power transmitted from the power transmission device or the number of times a notification that the power transfer abnormality related to power transfer has occurred has been received from outside; and (ii) determining that there is an abnormality in the power transmission device when the counted number of times becomes equal to or greater than a predetermined value.

A fifth aspect of the present disclosure relates to an abnormality determination device in a power reception device of a contactless power supply system. The power reception determination device is configured to: (i) count the number of times an abnormality related to power transfer has occurred between the power reception device and a power transmission device configured to contactlessly transmit electric power to the power reception device or the number of times a notification that the abnormality related to power transfer has occurred has been received from outside; and (ii) determine that there is an abnormality in the power reception device when the counted number of times becomes equal to or greater than a predetermined value.

A sixth aspect of the present disclosure relates to an abnormality determination method for a power reception device of a contactless power supply system. The abnormality determination method for the power reception device includes: (i) counting the number of times a power transfer abnormality has occurred between the power reception device and a power transmission device configured to contactlessly transmit electric power to the power reception device or the number of times a notification that the power transfer abnormality related to power transfer has occurred has been received from outside; and (ii) determining that there is an abnormality in the power reception device when the counted number of times becomes equal to or greater than a predetermined value.

According to the first, second, third, fourth, fifth, and sixth aspects of the present disclosure, when an abnormality related to power transfer occurs between the power transmission device and the power reception device, whether the cause of the abnormality lies in the power transmission device or in the power reception device can be determined based on the number of times the power transfer abnormality has occurred or the number of times the notification that the abnormality has occurred has been received from the outside.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 shows the state in which there is an abnormality in a power reception device mounted on the vehicle and a power transfer abnormality has occurred between the power reception device and a plurality of the ground power supply devices in the first embodiment;

DETAILED DESCRIPTION OF EMBODIMENTS

Figure 1:
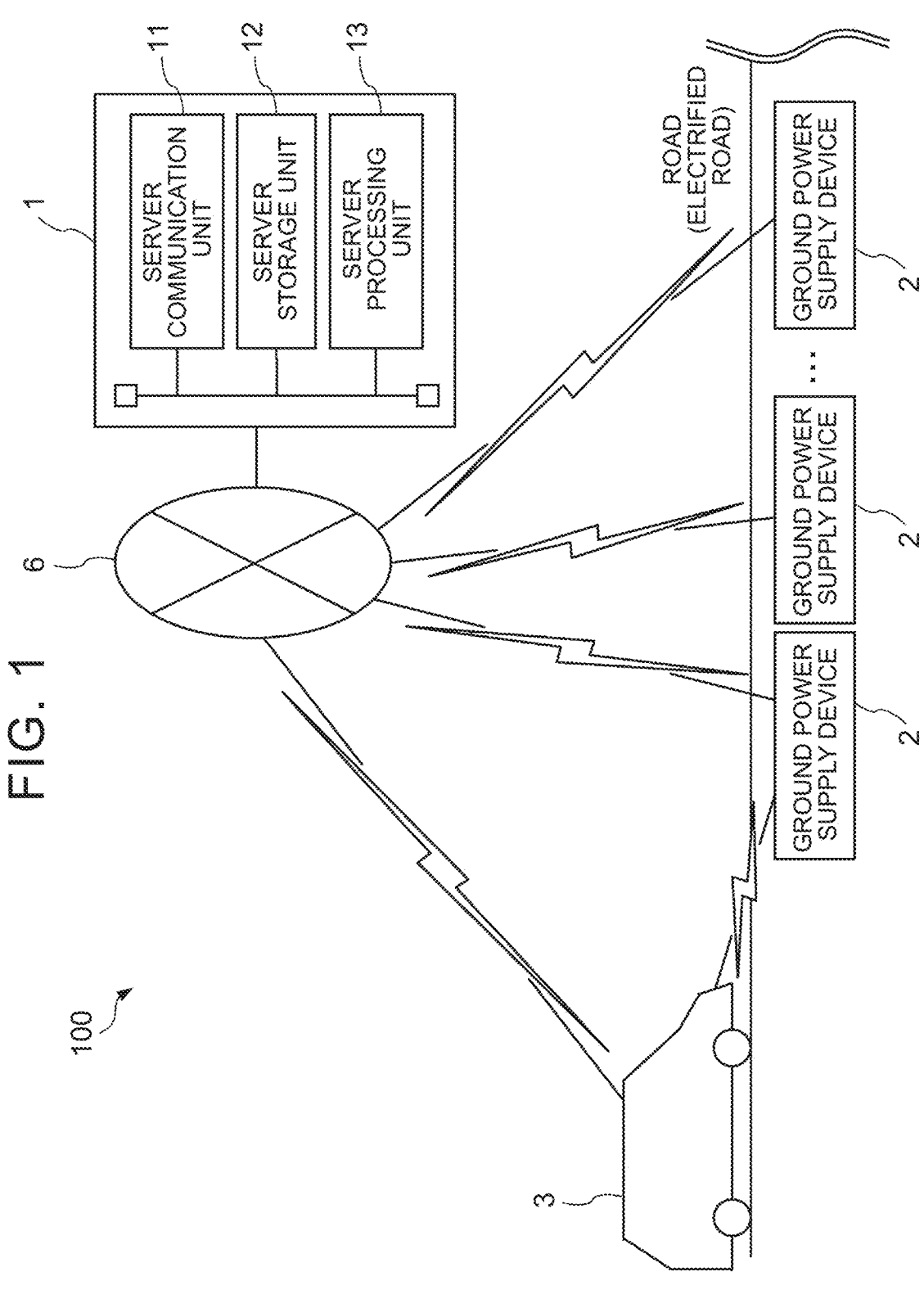
FIG. 1 is a schematic configuration diagram of a contactless power supply system according to a first embodiment of the present disclosure.

Embodiments will be described in detail with reference to the drawings. In the following description, like constituent elements are denoted by like reference numerals.

First, a first embodiment of the present disclosure will be described below. FIG. 1 is a schematic configuration diagram of a contactless power supply system 100 according to the first embodiment of the present disclosure.

The contactless power supply system 100 includes a server 1, ground power supply devices 2, and a vehicle 3 that is an example of the moving body of the present disclosure. The contactless power supply system 100 is configured to contactlessly supply electric power from the ground power supply device 2 to the vehicle 3 by contactless power transfer using various transfer methods such as, for example, magnetic field coupling (electromagnetic induction), electric field coupling, magnetic resonance coupling (magnetic resonance), and electric resonance coupling (electric resonance). FIG. 1 shows an example in which the ground power supply devices 2 are set at predetermined intervals in a row along a road as an installation example of the ground power supply devices 2.

As shown in FIG. 1, the server 1 includes a server communication unit 11, a server storage unit 12, and a server processing unit 13.

The server communication unit 11 includes a communication interface circuit for connecting the server 1 to a network 6, and is configured to communicate with the ground power supply devices 2 and the vehicle 3 via the network 6.

The server storage unit 12 includes a storage medium such as a hard disk drive (HDD), a solid state drive (SSD), an optical recording medium, and a semiconductor memory, and stores various computer programs, data, etc. to be used for processing in the server processing unit 13.

The server processing unit 13 includes a processor having one or more central processing units (CPUs) and their peripheral circuits. The server processing unit 13 performs various processes based on the various computer programs stored in the server storage unit 12. For example, when the server processing unit 13 receives a signal requesting to use the contactless power supply system 100 from the vehicle 3, the server processing unit 13 checks whether the vehicle 3 is authorized to use the contactless power supply system 100. When the authorization is confirmed, the server processing unit 13 transmits and receives various kinds of information to and from the vehicle 3 and the ground power supply devices 2 so that the vehicle 3 can receive power supply from the ground power supply devices 2. Since such transmission and reception of the various kinds of information is not the main part of the present disclosure, description thereof will be omitted.

Next, the configurations of those portions of the ground power supply device 2 and vehicle 3 that are related to contactless power supply according to the first embodiment will be described with reference to FIGS. 2 and 3.

Figure 2:
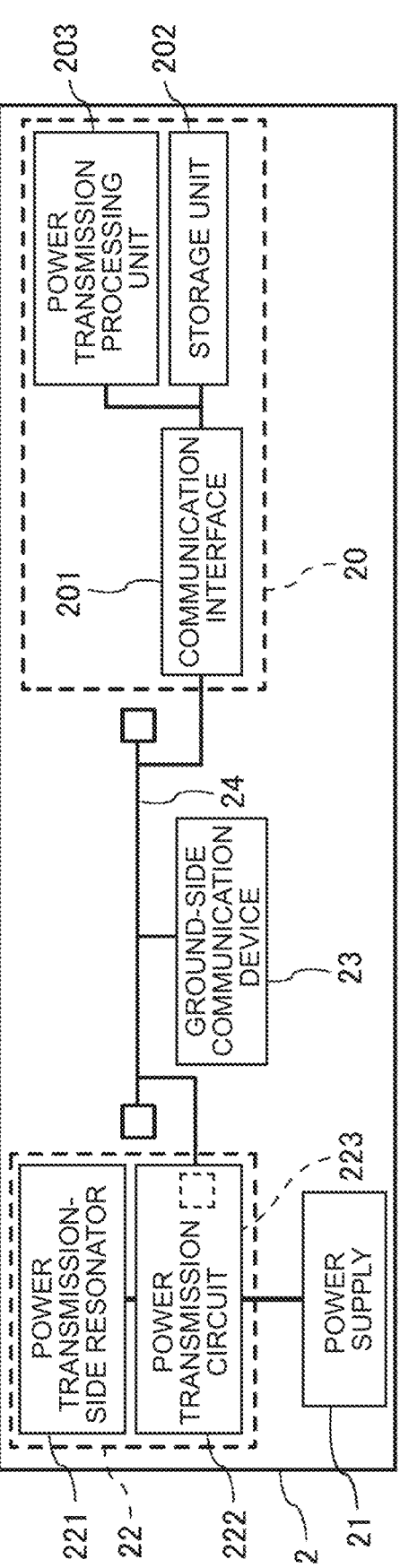
FIG. 2 shows an example of the configuration of a ground power supply device according to the first embodiment of the present disclosure.

FIG. 2 shows an example of the configuration of the ground power supply device 2 according to the first embodiment.

As shown in FIG. 2, the ground power supply device 2 includes a power supply 21, a power transmission device 22, a ground-side communication device 23, and a power transmission control device 20. The power transmission device 22 and the ground-side communication device 23 are connected to the power transmission control device 20 via an internal network 24 of the ground power supply device 2 conforming to a standard such as a Controller Area Network (CAN). Although FIG. 2 shows an example in which the ground power supply device 2 includes one power transmission device 22, the ground power supply device 2 may include a plurality of power transmission devices 22.

The power supply 21 supplies electric power to the power transmission device 22. The power supply 21 is, for example, a commercial alternating current (AC) power supply that supplies single phase AC power. The power supply 21 may be other AC power supply that supplies three phase AC power, or may be a direct current (DC) power supply such as a fuel cell.

The power transmission device 22 is a device for transferring electric power supplied from the power supply 21 to the vehicle 3, and includes a power transmission-side resonator 221 and a power transmission circuit 222.

The power transmission-side resonator 221 is a resonant circuit including a power transmission coil, and is configured to resonate at a predetermined resonant frequency $f_0$. In the first embodiment, the resonant frequency $f_0$ is set to 85 (kHz) defined by the SAE TIR J2954 standard as the frequency band for contactless power transfer. However, the resonant frequency $f_0$ is not limited to this.

As will be described later with reference to FIG. 3, the vehicle 3 is provided with a power reception-side resonator 311 (see FIG. 3) corresponding to the power transmission-side resonator 221. The power reception-side resonator 311 is a resonant circuit including a power reception coil, and is configured to resonate at the same resonant frequency $f_0$ as the power transmission-side resonator 221. By causing the power transmission-side resonator 221 to resonate, the power transmission coil of the power transmission-side resonator 221 and the power reception coil of the power reception-side resonator 311 that are spaced apart are magnetically coupled, so that electric power is contactlessly transferred from the power transmission device 22 to a power reception device 31.

The power transmission circuit 222 is an electric circuit that includes a rectifier and an inverter. The power transmission circuit 222 is configured to be controlled by the power transmission control device 20 to convert AC power supplied from the power supply 21 to DC power by the rectifier, convert by the inverter this DC power to desired AC power that can cause the power transmission-side resonator 221 to resonate, and supply this AC power to the power transmission-side resonator 221. The configuration of the power transmission circuit 222 is not limited to this configuration, and may be changed as appropriate according to the type of the power supply 21 etc.

The power transmission circuit 222 is provided with a power transmission sensor 223 for detecting whether electric power is being transmitted normally (in other words, whether contactless power supply is being performed normally). The power transmission sensor 223 includes, for example, a power transmission-side current sensor that detects a current I1 flowing through the power transmission-side resonator 221 (also referred to as "power transmission-side current"), and a power transmission-side voltage sensor that detects a voltage V1 to be applied to the power transmission-side resonator 221 (also referred to as "power transmission-side voltage"). A detection signal from the power transmission sensor 223 is input to the power transmission control device 20.

The ground-side communication device 23 includes an antenna and a signal processing circuit that performs various processes related to wireless communication such as modulation and demodulation of radio signals. The ground-side communication device 23 is configured to communicate with the external server 1 and the vehicle 3. The ground-side communication device 23 and the vehicle 3 can communicate with each other either directly or indirectly via the server 1. When the ground-side communication device 23 receives a radio signal from the outside, it transfers the radio signal to the power transmission control device 20. When a signal to be transmitted to the outside is transferred from the power transmission control device 20 to the ground-side communication device 23, the ground-side communication device 23 generates a radio signal including this signal and transmits the radio signal to the outside.

The power transmission control device 20 includes a communication interface 201, a storage unit 202, and a power transmission processing unit 203.

The communication interface 201 is a communication interface circuit for connecting the power transmission control device 20 to the internal network 24 of the ground power supply device 2.

The storage unit 202 includes a storage medium such as an HDD, an SSD, an optical recording medium, and a semiconductor memory, and stores various computer programs, data, etc. to be used for processing in the power transmission processing unit 203.

The power transmission processing unit 203 includes a processor having one or more CPUs and their peripheral circuits. The power transmission processing unit 203 performs various processes based on the various computer programs stored in the storage unit 202. The processes that are performed by the power transmission processing unit 203 and the power transmission control device 20 will be described later with reference to FIG. 4 etc.

Figure 3:
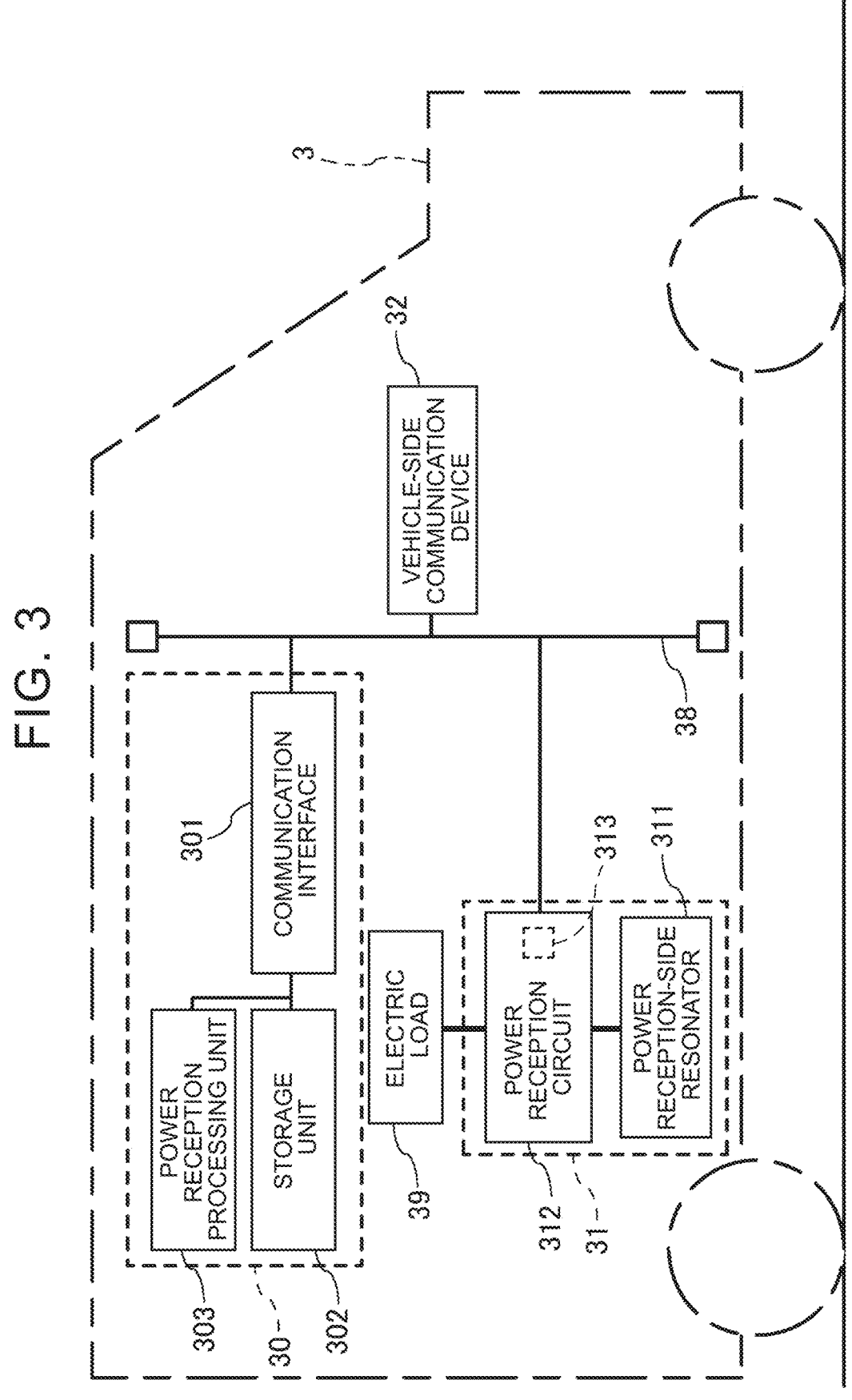
FIG. 3 shows an example of the configurations of those portions of a vehicle (moving body) shown in FIG. 1 that are related to contactless power supply.

FIG. 3 shows an example of the configurations of those portions of the vehicle 3 that are related to contactless power supply according to the first embodiment.

As shown in FIG. 3, the vehicle 3 includes the power reception device 31, a vehicle-side communication device 32 that is the moving body-side communication device of the present disclosure, and a power reception control device 30. The power reception device 31 and the vehicle-side communication device 32 are connected to the power reception control device 30 via an in-vehicle network 38 conforming to a standard such as CAN. The power reception control device 30 can be connected to other devices mounted on the vehicle 3 (e.g., a Global Positioning System (GPS) device that detects the current position of the vehicle 3, etc.) as necessary, and can thus acquire various kinds of Information as necessary.

The power reception device 31 includes the power reception-side resonator 311 and a power reception circuit 312.

As described above, the power reception-side resonator 311 is a resonant circuit including a power reception coil, and is configured to resonate at the same resonant frequency $f_0$ as the power transmission-side resonator 221.

The power reception circuit 312 is an electric circuit that includes a rectifier and a direct current-to-direct current (DC-to-DC) converter. The power reception circuit 312 is configured to be controlled by the power reception control device 30 to convert AC power output from the power reception-side resonator 311 to DC power by the rectifier and supply this DC power to an electric load 39 via the DC-to-DC converter. Examples of the electric load 39 include, but are not particularly limited to, a battery and an electric motor. In the first embodiment, the power reception circuit 312 is connected to a battery that is the electric load 39.

The power reception circuit 312 is provided with a power reception sensor 313 for detecting whether electric power is being received normally (in other words, whether contactless power supply is being performed normally). The power reception sensor 313 includes, for example, a power reception-side current sensor that detects an output current I2 of the rectifier (also referred to as "power reception-side current"), and a power reception-side voltage sensor that detects an output voltage V2 of the rectifier (also referred to as "power reception-side voltage"). A detection signal from the power reception sensor 313 is input to the power reception control device 30.

The vehicle-side communication device 32 includes an antenna and a signal processing circuit that performs various processes related to wireless communication such as modulation and demodulation of radio signals. The vehicle-side communication device 32 is configured to communicate with the external server 1 and the ground power supply device 2. The vehicle-side communication device 32 and the ground power supply device 2 can communicate with each other either directly or indirectly via the server 1. When the vehicle-side communication device 32 receives a radio signal from the outside, it transfers the radio signal to the power reception control device 30. When a signal to be transmitted to the outside is transferred from the power reception control device 30 to the vehicle-side communication device 32, the vehicle-side communication device 32 generates a radio signal including this signal and transmits the radio signal to the outside.

The power reception control device 30 includes a communication interface 301, a storage unit 302, and a power reception processing unit 303.

The communication interface 301 is a communication interface circuit for connecting the power reception control device 30 to the in-vehicle network 38.

The storage unit 302 includes a storage medium such as an HDD, an SSD, an optical recording medium, and a semiconductor memory, and stores various computer programs, data, etc. to be used for processing in the power reception processing unit 303.

The power reception processing unit 303 includes a processor having one or more CPUs and their peripheral circuits. The power reception processing unit 303 performs various processes based on the various computer programs stored in the storage unit 302. The processes that are performed by the power reception processing unit 303 and the power reception control device 30 will be described later with reference to FIG. 5 etc.

When an abnormality related to power transfer (hereinafter referred to as "power transfer abnormality"), such as electric power not being able to be transmitted or received normally between the power transmission device 22 and the power reception device 31, occurs in the contactless power supply system 100, it is necessary to determine whether the cause of the power transfer abnormality lies in the power transmission device 22 or in the power reception device 31. If an abnormality of the power transmission device 22 is left uncorrected, each vehicle 3 will not be able to receive power supply from the power transmission device 22. Therefore, a plurality of vehicles 3 will be affected. If an abnormality of the power reception device 31 is left uncorrected, the vehicle 3 equipped with the power reception device 31 will not be able to receive power supply from the power transmission device 22. Therefore, traveling of the vehicle 3 may be adversely affected.

However, the power transmission device 22 and the power reception device 31 are physically separated from each other. Therefore, when a power transfer abnormality occurs, the ground power supply device 2 may not be able to determine whether it cannot transmit electric power normally because there is an abnormality in the power transmission device 22 of the ground power supply device 2 or because there is an abnormality in the power reception device 31 of the vehicle 3, and similarly, the vehicle 3 may not be able to determine whether it cannot receive electric power normally because there is an abnormality in the power transmission device 22 of the ground power supply device 2 or because there is an abnormality in the power reception device 31 of the vehicle 3.

In the first embodiment, when a power transfer abnormality occurs, whether the cause of the power transfer abnormality lies in the ground power supply device 2 or in the vehicle 3 can be determined, and the source of the power transfer abnormality can be identified. Hereinafter, processes that are performed by the power transmission control device 20 and the power reception control device 30 to identify the source of a power transfer abnormality will be described with reference to FIGS. 4 to 8.

Figure 4:
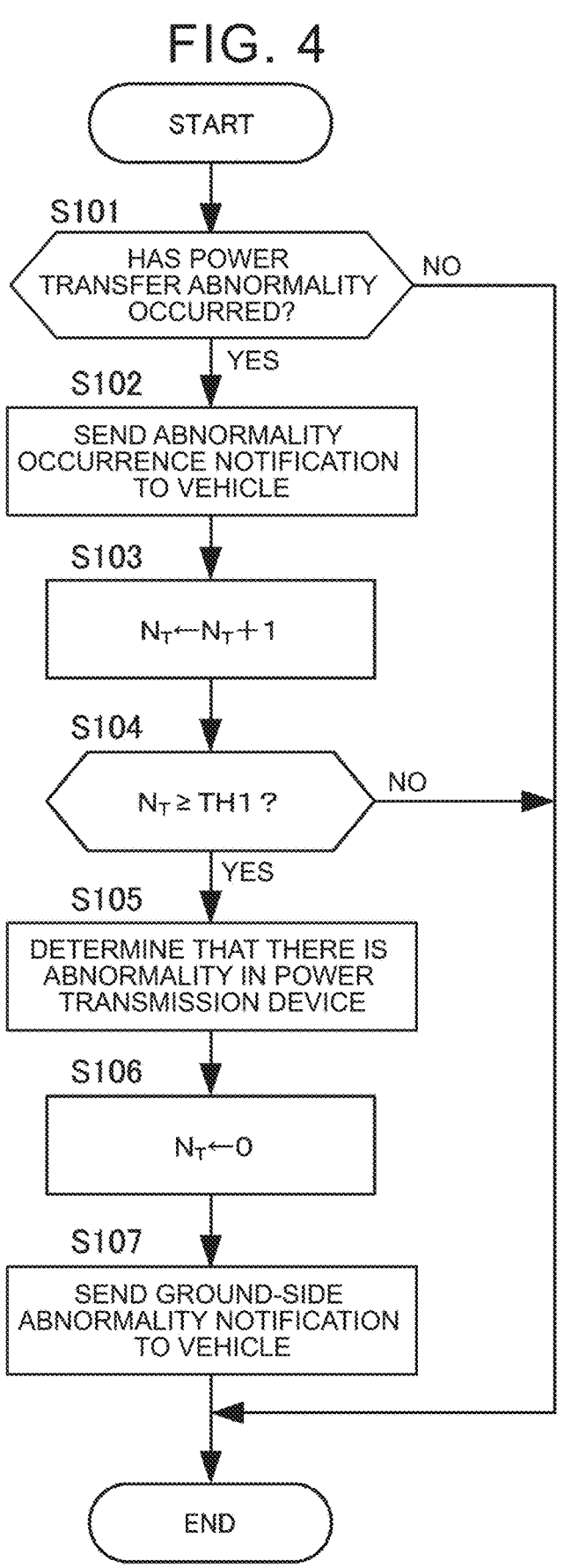
FIG. 4 is a flowchart of a process according to the first embodiment of the present disclosure that is performed by a power transmission control device shown in FIG. 2 to identify the source of a power transfer abnormality.

FIG. 4 is a flowchart of a process according to the first embodiment that is performed by the power transmission control device 20 to identify the source of a power transfer abnormality. In the first embodiment, the power transmission control device 20 performs this process every time the vehicle 3 desiring contactless power supply passes over the power transmission device 22.

In step S101, the power transmission control device 20 determines whether a power transfer abnormality has occurred with the power reception device 31 mounted on the vehicle 3 that has passed over the power transmission device 22. For example, when the power transmission control device 20 detects, based on a detection signal from the power transmission sensor 223, that electric power has not been successfully transmitted even though the vehicle 3 that desires contactless power supply has passed over the power transmission device 22 (that is, the amount of power that has been transmitted is zero), or that the amount of power that has been transmitted to the vehicle 3 is smaller than a target value, the power transmission control device 20 can determine that a power transfer abnormality has occurred with the power reception device 31 mounted on the vehicle 3. When the power transmission control device 20 determines that a power transfer abnormality has occurred with the power reception device 31 mounted on the vehicle 3 that has passed over the power transmission device 22, the process proceeds to step S102. On the other hand, when the power transmission control device 20 determines that a power transfer abnormality has not occurred with the power reception device 31 mounted on the vehicle 3 that has passed over the power transmission device 22, the current process ends.

In step S102, the power transmission control device 20 sends an abnormality occurrence notification to the vehicle 3 equipped with the power reception device 31 involved in the power transfer abnormality that has occurred with the power transmission device 22. This abnormality occurrence notification is a notification that a power transfer abnormality has occurred with the power reception device 31 of the vehicle 3. A process that is performed by the power reception control device 30 of the vehicle 3 in response to the abnormality occurrence notification will be described later with reference to FIG. 5. The abnormality occurrence notification may be sent to the vehicle 3 either directly or indirectly via the server 1.

In step S103, the power transmission control device 20 adds one to a power transmission-side counter N T to increment the power transmission-side counter N T. The power transmission-side counter N T is a counter that is incremented by the power transmission control device 20 every time the power transmission control device 20 determines that a power transfer abnormality has occurred with the power reception device 31. The initial value of the power transmission-side counter N T is set to zero.

In step S104, the power transmission control device 20 determines whether the power transmission-side counter N T is equal to or greater than a predetermined abnormality determination threshold TH1. When the power transmission control device 20 determines that the power transmission-side counter N T is equal to or greater than the predetermined abnormality determination threshold TH1, the process proceeds to step S105. On the other hand, when the power transmission control device 20 determines that the power transmission-side counter N T is less than the abnormality determination threshold TH1, the current process ends.

In step S105, the power transmission control device 20 determines that the cause of the power transfer abnormality that has occurred with the power reception device 31 lies in the ground power supply device 2. This is because, when the number of times the power transmission control device 20 has determined that a power transfer abnormality has occurred with the power reception device 31 (power transmission-side counter N T) becomes equal to or greater than a predetermined value (abnormality determination threshold TH1), that is, when the number of times a power transfer abnormality has been detected in the ground power supply device 2 becomes equal to or greater than a predetermined value, it can be determined that it is highly probable that there is an abnormality in the power transmission device 22.

In step S106, the power transmission control device 20 resets the power transmission-side counter N T to the initial value of zero.

In step S107, the power transmission control device 20 sends a notification to the vehicle 3 to which the abnormality occurrence notification has been sent. This notification is a notification that the cause of the power transfer abnormality that has occurred with the power reception device 31 mounted on the vehicle 3 lies in the power transmission device 22 of the ground power supply device 2 (hereinafter referred to as "ground-side abnormality notification"). A process that is performed by the power reception control device of the vehicle 3 in response to the ground-side abnormality notification will be described later with reference to FIG. 7.

Figure 5:
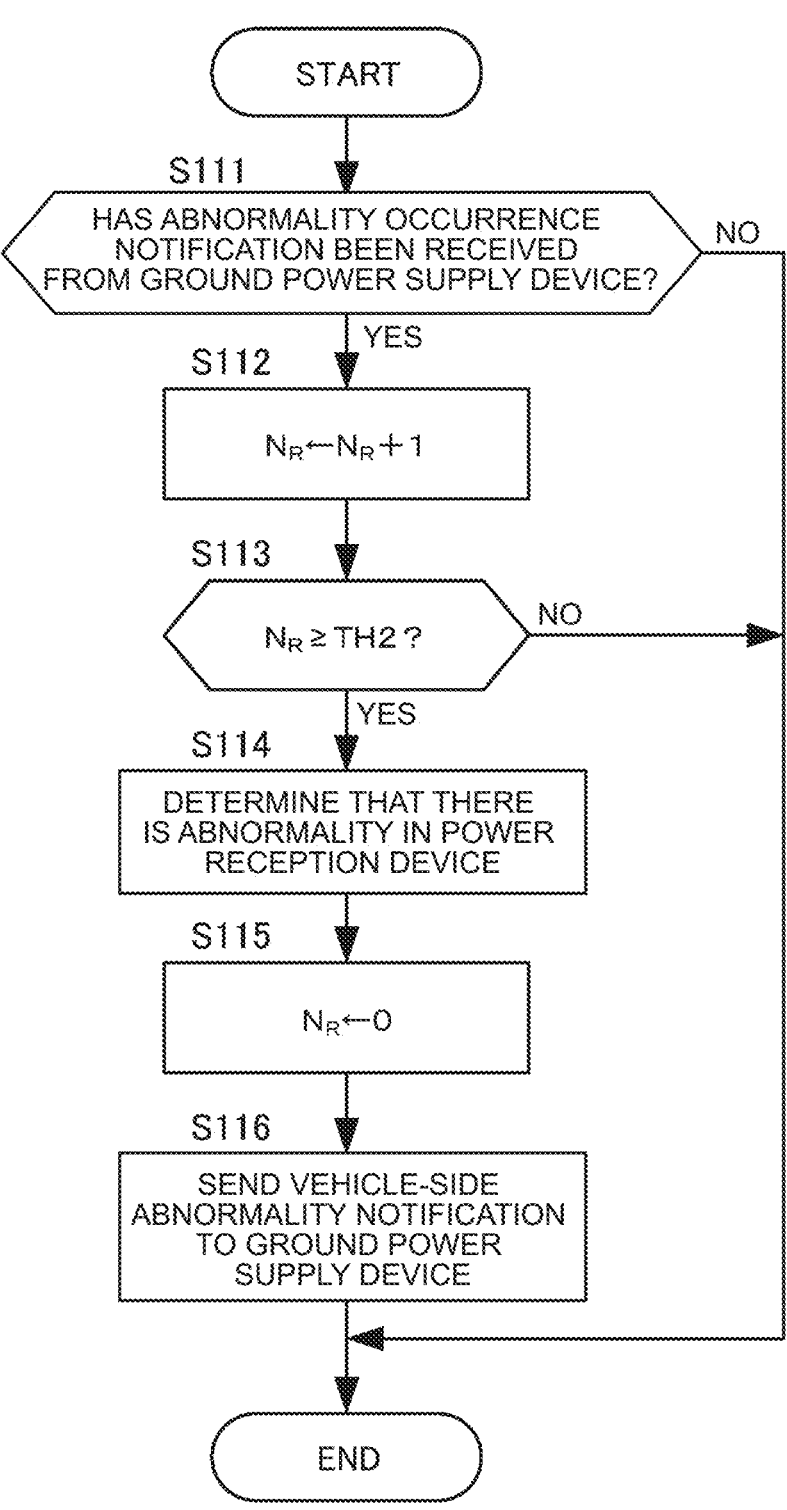
FIG. 5 is a flowchart of a process according to the first embodiment of the present disclosure that is performed by a power reception control device shown in FIG. 3 to identify the source of a power transfer abnormality when the vehicle receives an abnormality occurrence notification from the ground power supply device.

FIG. 5 is a flowchart of a process according to the first embodiment that is performed by the power reception control device 30 to identify the source of the power transfer abnormality when the vehicle 3 receives an abnormality occurrence notification from the ground power supply device 2.

In step S111, the power reception control device 30 determines whether an abnormality occurrence notification has been received from the ground power supply device 2. When the power reception control device 30 determines that an abnormality occurrence notification has been received from the ground power supply device 2, the process proceeds to step S112. When the power reception control device 30 determines that an abnormality occurrence notification has not been received from the ground power supply device 2, the current process ends.

In step S112, the power reception control device 30 adds one to a power reception-side counter $N_R$ to increment the power reception-side counter $N_R$. The power reception-side counter $N_R$ is a counter that is incremented every time an abnormality occurrence notification is received from the ground power supply device 2. The initial value of the power reception-side counter $N_R$ is set to zero.

In step S113, the power reception control device 30 determines whether the power reception-side counter $N_R$ is equal to or greater than a predetermined abnormality determination threshold TH2. When the power reception control device 30 determines that the power reception-side counter $N_R$ is equal to or greater than the abnormality determination threshold TH2, the process proceeds to step S114. On the other hand, when the power reception control device 30 determines that the power reception-side counter $N_R$ is less than the abnormality determination threshold TH2, the current process ends.

In step S114, the power reception control device 30 determines that the cause of the power transfer abnormality that has occurred with the power transmission device 22 of each ground power supply device 2 that has sent the abnormality occurrence notification lies in the power reception device 31 of the vehicle 3. This is because, as shown in FIG. 6, when a power transfer abnormality has occurred with a plurality of ground power supply devices 2 and the number of times an abnormality occurrence notification has been received from each ground power supply device 2 (power reception-side counter N R) becomes equal to or greater than a predetermined value (abnormality determination threshold TH2), it can be determined that it is highly probable that there is an abnormality in the power reception device 31 of the vehicle 3.

In step S115, the power reception control device 30 resets the power reception-side counter $N_R$ to the initial value of zero.

In step S116, the power reception control device 30 sends a notification to each ground power supply device 2 that has sent the abnormality occurrence notification. This notification is a notification that the cause of the power transfer abnormality that has occurred with the power transmission device 22 of the ground power supply device 2 lies in the power reception device 31 of the vehicle 3 (hereinafter referred to as "vehicle-side abnormality notification"). A process that is performed by the power transmission control device 20 of the ground power supply device 2 in response to the vehicle-side abnormality notification will be described later with reference to FIG. 8.

Figure 7:
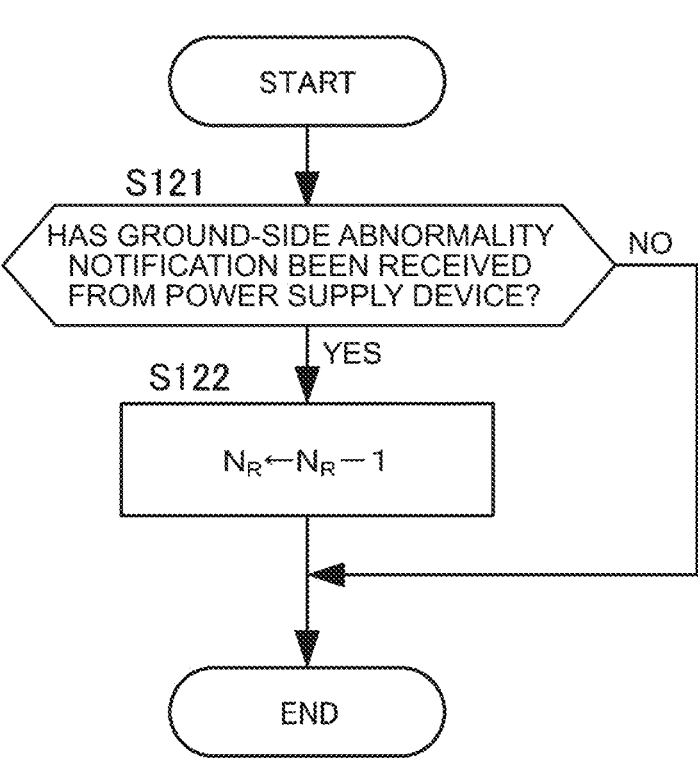
FIG. 7 is a flowchart of a process that is performed by the power reception control device of the vehicle when the vehicle receives a ground-side abnormality notification from the ground power supply device.

FIG. 7 is a flowchart of a process that is performed by the power reception control device 30 of the vehicle 3 when the vehicle 3 receives a ground-side abnormality notification from the ground power supply device 2.

In step S121, the power reception control device 30 determines whether a ground-side abnormality notification has been received from the ground power supply device 2 that has sent the abnormality occurrence notification. When the power reception control device 30 determines that a ground-side abnormality notification has been received from the ground power supply device 2, the process proceeds to step S122. On the other hand, when the power reception control device 30 determines that a ground-side abnormality notification has not been received from the ground power supply device 2, the current process ends.

In step S122, the power reception control device 30 subtracts one from the power reception-side counter $N_R$ to decrement the power reception-side counter N R. When a ground-side abnormality notification is received from the ground power supply device 2 that has sent the abnormality occurrence notification, it means that it has been found that the cause of the power transfer abnormality that has occurred between the power transmission device 22 of the ground power supply device 2 and the power reception device 31 of the vehicle 3 lies in the ground power supply device 2. Therefore, by decrementing the power reception-side counter N R every time a ground-side abnormality notification is received, the power reception-side counter N R can be suppressed from continuing to increase even though there is no abnormality in the power reception device 31 of the vehicle 3, and therefore, erroneous determination can be suppressed.

Figure 8:
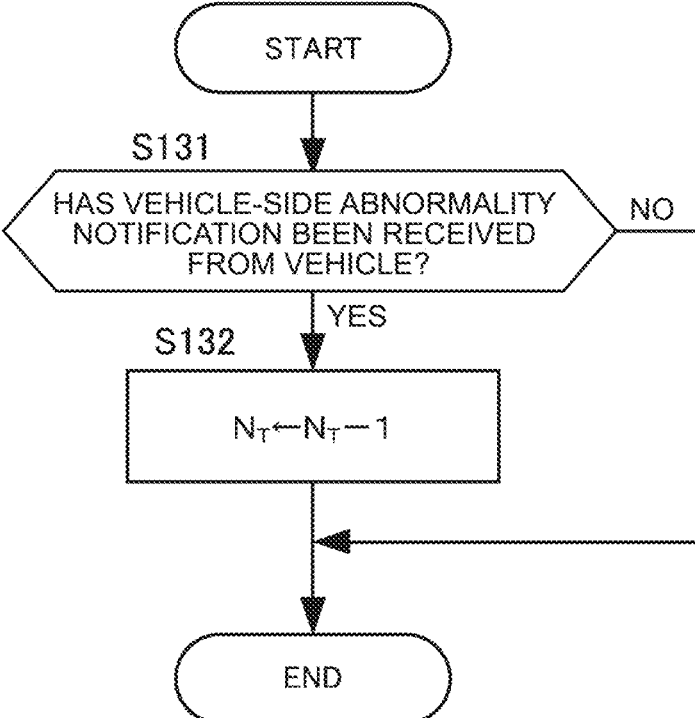
FIG. 8 is a flowchart of a process that is performed by the power transmission control device of the ground power supply device when the ground power supply device receives a vehicle-side abnormality notification (moving body-side abnormality notification) from the vehicle.

FIG. 8 is a flowchart of a process that is performed by the power transmission control device 20 of the ground power supply device 2 when the ground power supply device 2 receives a vehicle-side abnormality notification from the vehicle 3.

In step S131, the power transmission control device 20 determines whether a vehicle-side abnormality notification has been received from the vehicle 3 to which the abnormality occurrence notification has been sent. When the power transmission control device 20 determines that a vehicle-side abnormality notification has been received from the vehicle 3, the process proceeds to step S132. On the other hand, when the power transmission control device 20 determines that a vehicle-side abnormality notification has not been received from the vehicle 3, the current process ends.

In step S132, the power transmission control device 20 subtracts one from the power transmission-side counter $N_T$ to decrement the power transmission-side counter $N_T$. When a vehicle-side abnormality notification is received from the vehicle 3 to which the abnormality occurrence notification has been sent, it means that it has been found that the cause of the power transfer abnormality that has occurred with the power reception device 31 of the vehicle 3 lies in the power reception device 31 of the vehicle 3. Therefore, by decrementing the power transmission-side counter $N_T$ every time a vehicle-side abnormality notification is received, the power transmission-side counter $N_T$ can be suppressed from continuing to increase even though there is no abnormality in the power transmission device 22, and therefore, erroneous determination can be suppressed.

The ground power supply device 2 according to the first embodiment described above includes: the power transmission device 22 for performing contactless power supply to the vehicle 3 equipped with the power reception device 31; the ground-side communication device 23 for communicating with the vehicle 3 that is an example of the moving body of the present disclosure; and the power transmission control device 20.

The power transmission control device 20 is configured to: (i) count the number of times a power transfer abnormality has occurred between the power transmission device 22 and the power reception device 31 to calculate the power transmission-side counter $N_T$; and (ii) determine that there is an abnormality in the power transmission device 22 when the power transmission-side counter $N_T$ becomes equal to or greater than the abnormality determination threshold TH1 (predetermined value).

When the number of times a power transfer abnormality has been detected in the ground power supply device 2 becomes equal to or greater than the predetermined value, it can be determined that it is highly probable that there is an abnormality in the power transmission device 22. Therefore, as in the first embodiment, whether the cause of the power transfer abnormality lies in the power transmission device 22 or in the power reception device 31 can be determined by comparing the number of times a power transfer abnormality has been detected in the ground power supply device 2 with the threshold.

The power transmission control device 20 is also configured to: (i) determine whether a power transfer abnormality has occurred; (ii) when a power transfer abnormality has occurred, send an abnormality occurrence notification to the vehicle 3 equipped with the power reception device 31 involved in the power transfer abnormality that has occurred with the power transmission device 22; and (iii) decrement the power transmission-side counter $N_T$ (counted number of times the power transfer abnormality has occurred) when a vehicle-side abnormality notification, namely a notification that there is an abnormality in the power reception device 31 mounted on the vehicle 3, is received from the vehicle 3 to which the abnormality occurrence notification has been sent.

When a vehicle-side abnormality notification is received from the vehicle 3 to which the abnormality occurrence notification has been sent, it means that it has been found that the cause of the power transfer abnormality that has occurred with the power reception device 31 of the vehicle 3 lies in the power reception device 31 of the vehicle 3. Therefore, by decrementing the power transmission-side counter $N_T$ every time a vehicle-side abnormality notification is received, the power transmission-side counter $N_T$ can be suppressed from continuing to increase even though there is no abnormality in the power transmission device 22, and therefore, erroneous determination can be suppressed.

The vehicle 3 (moving body) according to the first embodiment includes: the power reception device 31 for receiving contactless power supply from the power transmission device 22 of the ground power supply device 2; the vehicle-side communication device 32 for communicating with the ground power supply device 2; and the power reception control device 30.

The power reception control device 30 is configured to: (i) count the number of times an abnormality occurrence notification, namely a notification that is sent from the ground power supply device 2 when a power transfer abnormality is detected in the ground power supply device 2, has been received to calculate the power reception-side counter $N_R$; and (ii) determine that there is an abnormality in the power reception device 31 when the power reception-side counter $N_R$ becomes equal to or greater than the abnormality determination threshold TH2 (predetermined value).

As described above with reference to FIG. 6, when there is an abnormality in the power reception device 31 mounted on the vehicle 3, a power transfer abnormality occurs between the power reception device 31 and a plurality of ground power supply devices 2. As a result, the number of times an abnormality occurrence notification has been received from each ground power supply device 2 increases. Therefore, when the number of times an abnormality occurrence notification has been received from each ground power supply device 2 becomes equal to or greater than the predetermined value, it can be determined that it is highly probable that there is an abnormality in the power reception device 31 of the vehicle 3. Accordingly, as in the first embodiment, whether the cause of the power transfer abnormality lies in the power transmission device 22 or in the power reception device 31 can be determined by comparing the number of times the vehicle 3 has received an abnormality occurrence notification sent from each ground power supply device 2 with the threshold.

The power reception control device 30 is also configured to decrement the power reception-side counter N R (counted number of times the abnormality occurrence notification has been received) when a ground-side abnormality notification, namely a notification that there is an abnormality in the power transmission device 22 of the ground power supply device 2, is received from the ground power supply device 2 that has sent the abnormality occurrence notification.

When a ground-side abnormality notification is received from the ground power supply device 2 that has sent the abnormality occurrence notification, it means that it has been found that the cause of the power transfer abnormality that has occurred between the power transmission device 22 of the ground power supply device 2 and the power reception device 31 of the vehicle 3 lies in the ground power supply device 2. Therefore, by decrementing the power reception-side counter N R every time a ground-side abnormality notification is received, the power reception-side counter N R can be suppressed from continuing to increase even though there is no abnormality in the power reception device 31 of the vehicle 3, and therefore, erroneous determination can be suppressed.

Next, a second embodiment of the present disclosure will be described. The second embodiment is different from the first embodiment in that whether a power transmission abnormality has occurred is determined in the vehicle 3 and that an abnormality occurrence notification is sent from the vehicle 3 to the ground power supply device 2. The differences will be mainly described below.

Figure 9:
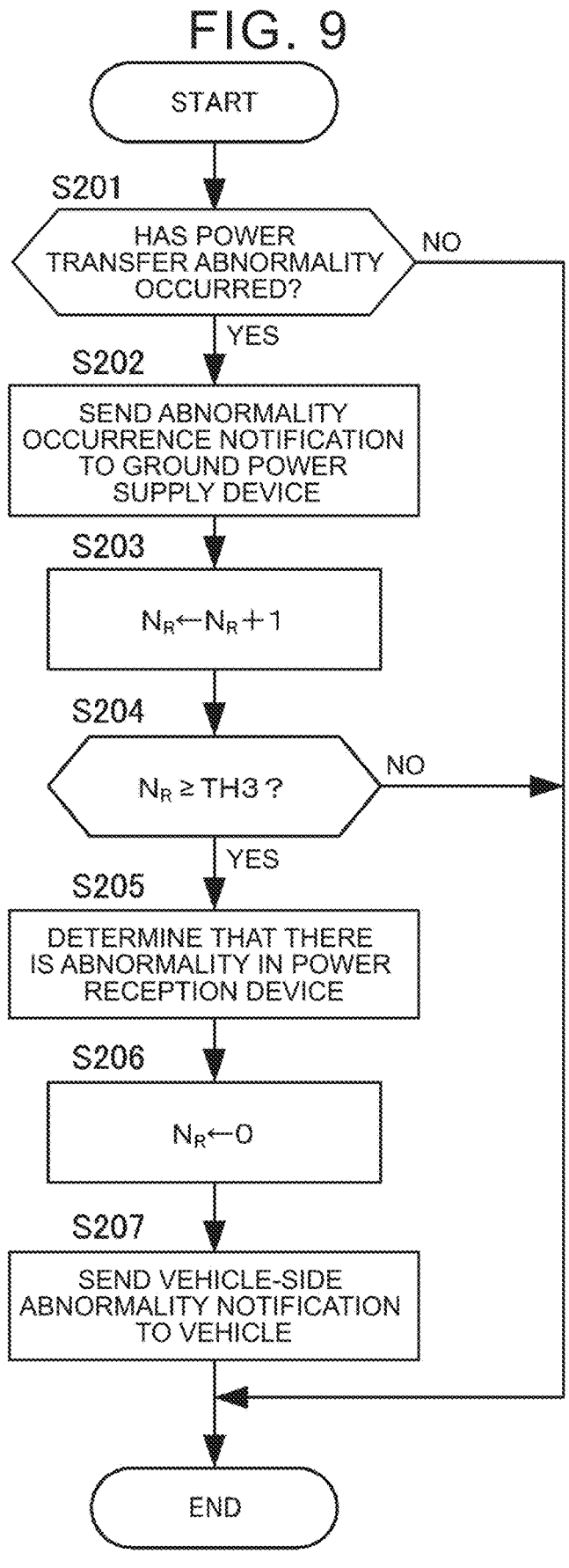
FIG. 9 is a flowchart of a process according to a second embodiment of the present disclosure that is performed by the power reception control device to identify the source of a power transfer abnormality.

FIG. 9 is a flowchart of a process according to the second embodiment that is performed by the power reception control device 30 to identify the source of a power transfer abnormality. In the second embodiment, the power reception control device 30 performs this process every time the vehicle 3 passes over the power transmission device 22 of the ground power supply device 2 requested to perform contactless power supply.

In step S201, the power reception control device 30 determines whether a power transfer abnormality has occurred with the power transmission device 22 of the ground power supply device 2 requested to perform contactless power supply. For example, when the power reception control device 30 detects, based on a detection signal from the power reception sensor 313, that electric power has not been successfully received even though the vehicle 3 has passed over the power transmission device 22 of the ground power supply device 2 requested to perform contactless power supply, or that the amount of power that has been received from the power transmission device 22 is smaller than a requested value, the power reception control device 30 can determine that a power transfer abnormality has occurred with the power transmission device 22. When the power reception control device determines that a power transfer abnormality has occurred with the power transmission device 22 of the ground power supply device 2 requested to perform contactless power supply, the process proceeds to step S202. When the power reception control device 30 determines that a power transfer abnormality has not occurred with the power transmission device 22 of the ground power supply device 2 requested to perform contactless power supply, the current process ends.

In step S202, the power reception control device 30 sends an abnormality occurrence notification to the ground power supply device 2 involved in the power transfer abnormality that has occurred with the power reception device 31. This abnormality occurrence notification is a notification that a power transfer abnormality has occurred with the power transmission device 22 of the ground power supply device 2. A process that is performed by the power transmission control device 20 of the ground power supply device 2 in response to the abnormality occurrence notification will be described later with reference to FIG. 10. The abnormality occurrence notification may be sent to the ground power supply device 2 either directly or indirectly via the server 1.

In step S203, the power reception control device 30 adds one to the power reception-side counter $N_R$ to increment the power reception-side counter N R. Unlike in the first embodiment, the power reception-side counter N R according to the second embodiment is a counter that is incremented every time the power reception control device 30 determines that a power transfer abnormality has occurred with the power transmission device 22. The initial value of the power reception-side counter $N_R$ is set to zero.

In step S204, the power reception control device 30 determines whether the power reception-side counter $N_R$ is equal to or greater than a predetermined abnormality determination threshold TH3. When the power reception control device 30 determines that the power reception-side counter $N_R$ is equal to or greater than the abnormality determination threshold TH3, the process proceeds to step S205. On the other hand, when the power reception control device 30 determines that the power reception-side counter $N_R$ is less than the abnormality determination threshold TH3, the current process ends.

In step S205, the power reception control device 30 determines that the cause of the power transfer abnormality that has occurred with the power transmission device 22 lies in the power reception device 31 of the vehicle 3. This is because, when the number of times the power reception control device 30 has determined that a power transfer abnormality has occurred with the power transmission device 22 (power reception-side counter $N_R$) becomes equal to or greater than a predetermined value (abnormality determination threshold TH3), that is, when the number of times a power transfer abnormality has been detected in the vehicle 3 becomes equal to or greater than a predetermined value, it can be determined that it is highly probable that there is an abnormality in the power reception device 31 of the vehicle 3.

In step S206, the power reception control device 30 resets the power reception-side counter $N_R$ to the initial value of zero.

In step S207, the power reception control device 30 sends a notification to the ground power supply device 2 to which the abnormality occurrence notification has been sent. This notification is a notification that the cause of the power transfer abnormality that has occurred with the power transmission device 22 of the ground power supply device 2 lies in the power reception device 31 of the vehicle 3 (vehicle-side abnormality notification). Since a process that is performed by the power transmission control device 20 of the ground power supply device 2 in response to the vehicle-side abnormality notification is similar to that described in the first embodiment with reference to FIG. 8, description thereof will be omitted.

Figure 10:
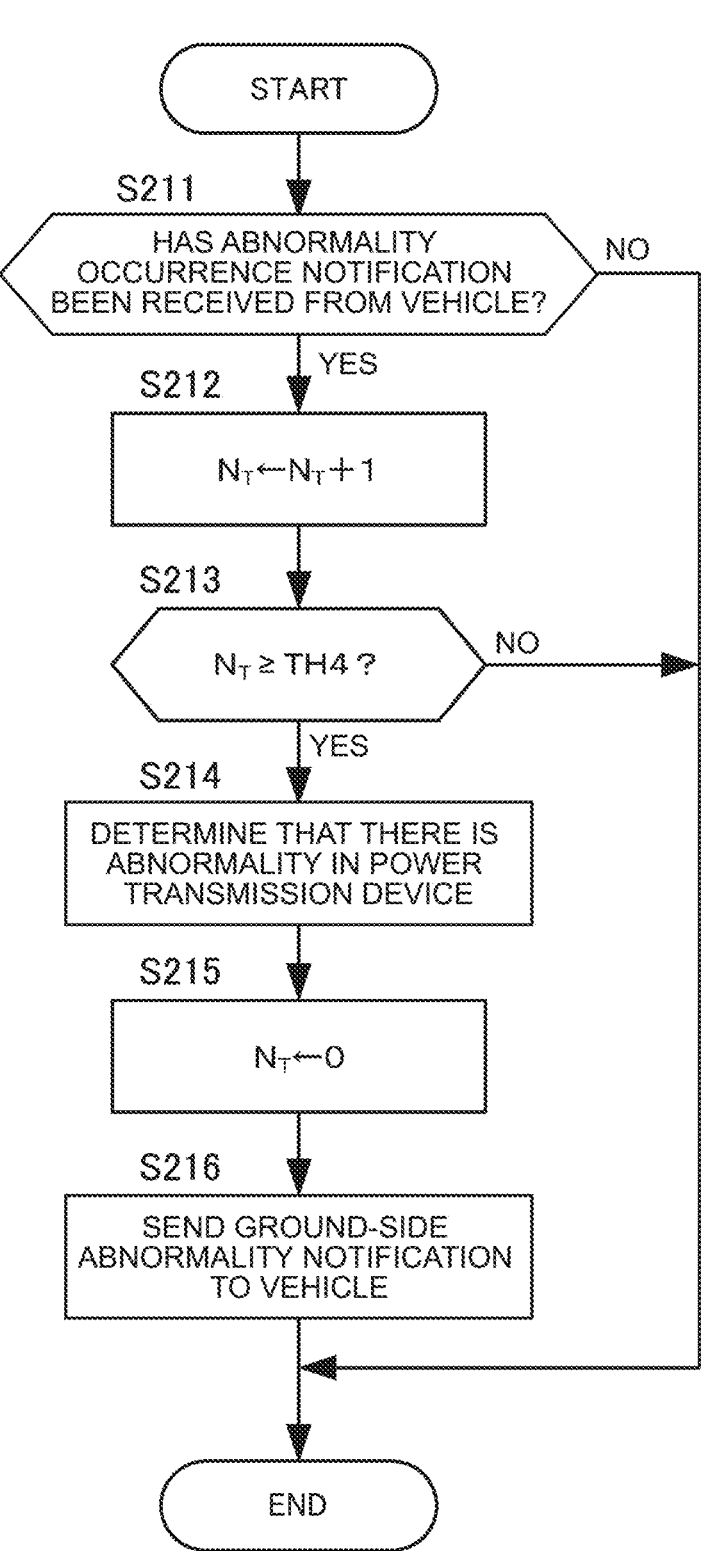
FIG. 10 is a flowchart of a process according to the second embodiment that is performed by the power transmission control device of the ground power supply device to identify the source of a power transfer abnormality when the ground power supply device receives an abnormality occurrence notification from the vehicle.

FIG. 10 is a flowchart of a process according to the second embodiment that is performed by the power transmission control device 20 of the ground power supply device 2 to identify the source of the power transfer abnormality when the ground power supply device 2 receives an abnormality occurrence notification from the vehicle 3.

In step S211, the power transmission control device 20 determines whether an abnormality occurrence notification has been received from the vehicle 3. When the power transmission control device 20 determines that an abnormality occurrence notification has been received from the vehicle 3, the process proceeds to step S212. On the other hand, when the power transmission control device 20 determines that an abnormality occurrence notification has not been received from the vehicle 3, the current process ends.

In step S212, the power transmission control device 20 adds one to the power transmission-side counter $N_T$ to increment the power transmission-side counter $N_T$. Unlike in the first embodiment, the power transmission-side counter $N_T$ according to the second embodiment is a counter that is incremented every time an abnormality occurrence notification is received from the vehicle 3. The initial value of the power transmission-side counter $N_T$ is set to zero.

In step S213, the power transmission control device 20 determines whether the power transmission-side counter $N_T$ is equal to or greater than a predetermined abnormality determination threshold TH4. When the power transmission control device 20 determines that the power transmission-side counter $N_T$ is equal to or greater than the abnormality determination threshold TH4, the process proceeds to step S214. On the other hand, when the power transmission control device 20 determines that the power transmission-side counter $N_T$ is less than the abnormality determination threshold TH4, the current process ends.

Figure 11:
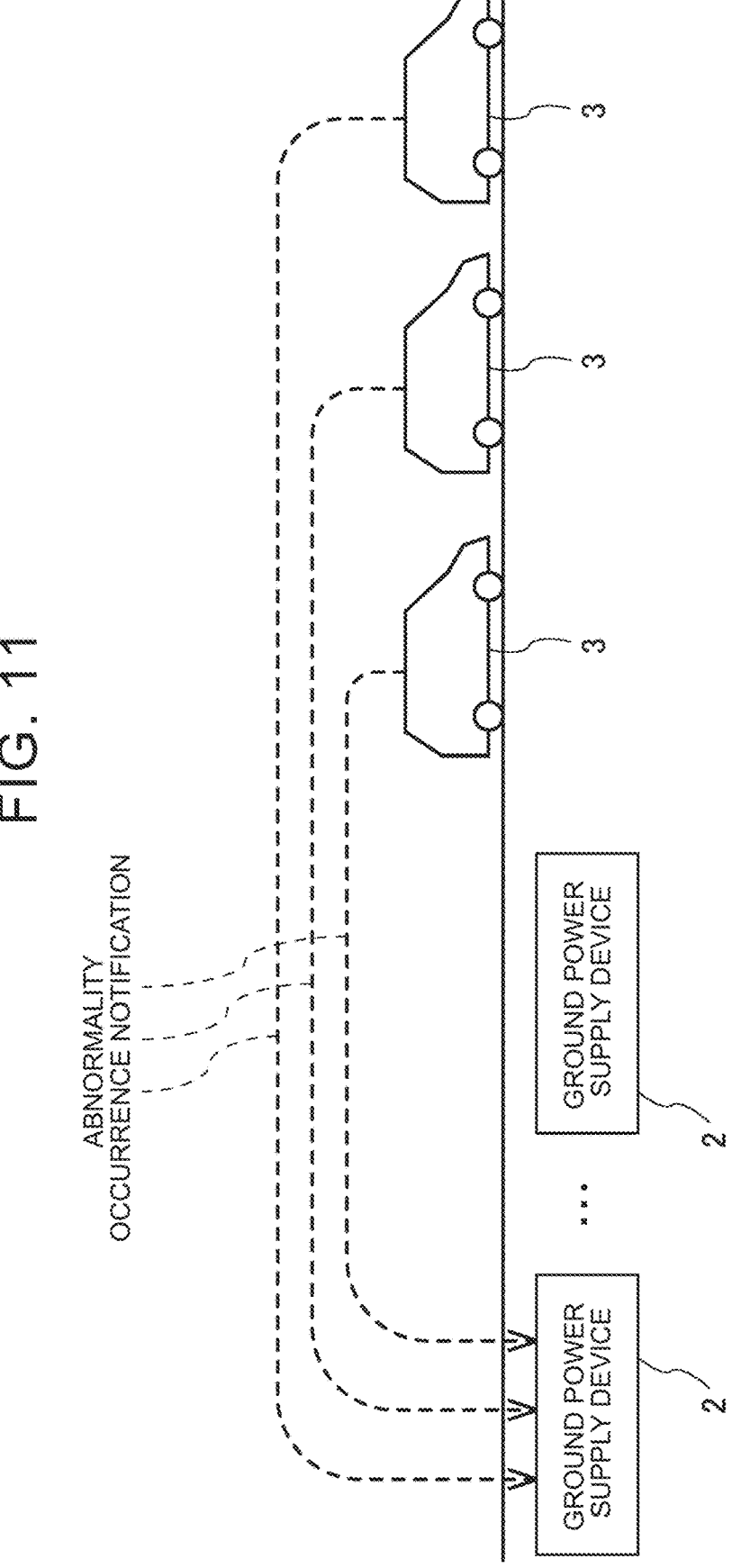
FIG. 11 shows the state in which there is an abnormality in a power transmission device of the ground power supply device and a power transfer abnormality has occurred between the power transmission device and a plurality of the vehicles in the second embodiment.

In step S214, the power transmission control device 20 determines that the cause of the power transfer abnormality that has occurred with the power reception device 31 of the vehicle 3 that has sent the abnormality occurrence notification lies in the power transmission device 22 of the ground power supply device 2. This is because, as shown in FIG. 11, when a power transfer abnormality has occurred with a plurality of vehicles 3 and the number of times an abnormality occurrence notification has been received from each vehicle 3 (power transmission-side counter $N_T$) becomes equal to or greater than a predetermined value (abnormality determination threshold TH4), it can be determined that it is highly probable that there is an abnormality in the power transmission device 22 of the ground power supply device 2.

In step S215, the power transmission control device 20 resets the power transmission-side counter $N_T$ to the initial value of zero.

In step S216, the power transmission control device 20 sends a notification to each vehicle 3 that has sent the abnormality occurrence notification. This notification is a notification that the cause of the power transfer abnormality that has occurred with the power reception device 31 of the vehicle 3 lies in the power transmission device 22 of the ground power supply device 2 ("ground-side abnormality notification"). Since a process that is performed by the power reception control device 30 of the vehicle 3 in response to the ground-side abnormality notification is similar to that described in the first embodiment with reference to FIG. 7, description thereof will be omitted.

The power transmission control device 20 of the ground power supply device 2 according to the second embodiment described above is configured to: (i) count the number of times an abnormality occurrence notification, namely a notification that is sent from the vehicle 3 (moving body) when a power transfer abnormality is detected in the moving body, has been received to calculate the power transmission-side counter $N_T$; and (i) determine that there is an abnormality in the power transmission device 22 when the power transmission-side counter $N_T$ becomes equal to or greater than the abnormality determination threshold TH4 (predetermined value).

As described above with reference to FIG. 11, when there is an abnormality in the power transmission device 22 of the ground power supply device 2, a power transfer abnormality occurs between the power transmission device 22 and a plurality of vehicles 3. As a result, the number of times an abnormality occurrence notification has been received from each vehicle 3 increases. Therefore, when the number of times an abnormality occurrence notification has been received from each vehicle 3 becomes equal to or greater than the predetermined value, it can be determined that it is highly probable that there is an abnormality in the power transmission device 22 of the ground power supply device 2. Accordingly, as in the second embodiment, whether the cause of the power transfer abnormality lies in the power transmission device 22 or in the power reception device 31 can be determined by comparing the number of times the ground power supply device 2 has received an abnormality occurrence notification from each vehicle 3 with the threshold.

The power transmission control device 20 is also configured to decrement the power transmission-side counter $N_T$ (counted number of times the abnormality occurrence notification has been received) when a vehicle-side abnormality notification, namely a notification that there is an abnormality in the power reception device 31 mounted on the vehicle 3, is received from the vehicle 3 that has sent the abnormality occurrence notification. The power transmission-side counter $N_T$ can thus be suppressed from continuing to increase even though there is no abnormality in the power transmission device 22, and therefore, erroneous determination can be suppressed.

The power reception control device 30 of the vehicle 3 (moving body) according to the second embodiment is configured to: (i) count the number of times a power transfer abnormality has occurred between the power transmission device 22 and the power reception device 31 to calculate the power reception-side counter N R; and (ii) determine that there is an abnormality in the power reception device 31 when the power reception-side counter $N_R$ becomes equal to or greater than the abnormality determination threshold TH3 (predetermined value).

When the number of times a power transfer abnormality has been detected in the vehicle 3 becomes equal to or greater than the predetermined value, it can be determined that it is highly probable that there is an abnormality in the power reception device 31 mounted on the vehicle 3. Therefore, as in the second embodiment, whether the cause of the power transfer abnormality lies in the power transmission device 22 or in the power reception device 31 can be determined by comparing the number of times a power transfer abnormality has been detected in the vehicle 3 with the threshold.

The power reception control device 30 determines whether a power transfer abnormality has occurred. When a power transfer abnormality has occurred, the power reception control device 30 sends an abnormality occurrence notification to the ground power supply device 2 that has the power transmission device 22 involved in the power transfer abnormality that has occurred with the power reception device 31. The power reception control device 30 is configured to decrement the power reception-side counter N R (counted number of times the power transfer abnormality has occurred) when a ground-side abnormality notification, namely a notification that there is an abnormality in the power transmission device 22 of the ground power supply device 2, is received from the ground power supply device 2 to which the abnormality occurrence notification has been sent.

When a ground-side abnormality notification is received from the ground power supply device 2 to which the abnormality occurrence notification has been sent, it means that it has been found that the cause of the power transfer abnormality that has occurred with the power transmission device 22 of the ground power supply device 2 lies in the power transmission device 22 of the ground power supply device 2. Therefore, by decrementing the power reception-side counter N R every time a ground-side abnormality notification is received, the power reception-side counter N R can be suppressed from continuing to increase even though there is no abnormality in the power reception device 31, and therefore, erroneous determination can be suppressed.

Although the first and second embodiments of the present disclosure are described above, the first and second embodiments merely illustrate a part of the application examples of the present disclosure, and are not intended to limit the technical scope of the present disclosure to the specific configurations of the above embodiments.

For example, the server 1 may perform a part of the processes that are performed by the power transmission control device 20 and the power reception control device 30 in each of the above embodiments. The thresholds TH1 to TH4 used for abnormality determination may be different values, a part of the thresholds TH1 to TH4 may be the same value, or all of the thresholds TH1 to TH4 may be the same value.

In each of the above embodiments, the power transmission control device is an example of the abnormality determination device that determines an abnormality in the power transmission device 22 of the contactless power supply system 100. Specifically, the power transmission control device 20 is an example of the abnormality determination device configured to: (i) count the number of times a power transfer abnormality has occurred between the power transmission device 22 and the power reception device 31 that contactlessly receives electric power transmitted from the power transmission device 22, or the number of times a notification that a power transfer abnormality has occurred has been received from the outside; and (ii) determine that there is an abnormality in the power transmission device 22 when the counted number of times becomes equal to or greater than a predetermined value.

Similarly, the power reception control device 30 is an example of the abnormality determination device that determines an abnormality in the power reception device 31 of the contactless power supply system 100. Specifically, the power reception control device 30 is an example of the abnormality determination device configured to: (i) count the number of times a power transfer abnormality has occurred between the power reception device 31 and the power transmission device 22 that contactlessly transmits electric power to the power reception device 31, or the number of times a notification that a power transfer abnormality has occurred has been received from the outside; and (ii) determine that there is an abnormality in the power reception device 31 when the counted number of times becomes equal to or greater than a predetermined value.

What is claimed is:

1. A ground power supply device comprising:
    a power transmission device configured to perform contactless power supply to a moving body including a power reception device;
    a ground-side communication device configured to communicate with the moving body; and
    a power transmission control device, wherein
    the power transmission control device is configured to count the number of times a power transfer abnormality has occurred between the power transmission device and the power reception device or the number of times an abnormality occurrence notification has been received, the abnormality occurrence notification being a notification that is sent from the moving body when the power transfer abnormality is detected in the moving body,
    the power transmission control device is configured to determine that there is an abnormality in the power transmission device when the number of times the power transfer abnormality has occurred or the number of times the abnormality occurrence notification has been received becomes equal to or greater than a predetermined value, and
    the power transmission control device is configured to: when the power transfer abnormality has occurred, send the abnormality occurrence notification to the moving body equipped with the power reception device involved in the power transfer abnormality that has occurred with the power transmission device; and when a moving body-side abnormality notification is received from the moving body to which the abnormality occurrence notification has been sent, decrement the counted number of times the power transfer abnormality has occurred or the counted number of times the abnormality occurrence notification has been received, the moving body-side abnormality notification being a notification that there is an abnormality in the power reception device mounted on the moving body.

2. The ground power supply device according to claim 1, wherein the power transmission control device is configured to:

determine whether the power transfer abnormality has occurred.

3. The ground power supply device according to claim 1, wherein the power transmission control device is configured to reset the counted number of times the power transfer abnormality has occurred or the counted number of times the abnormality occurrence notification has been received to an initial value when the power transmission control device determines that there is an abnormality in the power transmission device.

4. The ground power supply device according to claim 1, wherein the power transmission control device is configured to determine that there is an abnormality in the power transmission device based on power transfer abnormalities that have occurred with a plurality of different moving bodies.

5. The ground power supply device according to claim 1, wherein the power transmission control device is configured to send a ground-side abnormality notification to the moving body to which the abnormality occurrence notification has been sent when the power transmission control device determines that there is an abnormality in the power transmission device, the ground-side abnormality notification being a notification that there is an abnormality in the power transmission device.

6. The ground power supply device according to claim 1, wherein the power transmission control device is configured to determine whether the power transfer abnormality has occurred based on a detection signal from a power transmission sensor that detects whether electric power is being transmitted normally.

7. A moving body comprising:

a power reception device configured to receive contactless power supply from a power transmission device of a ground power supply device;

a moving body-side communication device configured to communicate with the ground power supply device; and a power reception control device, wherein the power reception control device is configured to count the number of times a power transfer abnormality has occurred between the power transmission device and the power reception device or the number of times an abnormality occurrence notification has been received, the abnormality occurrence notification being a notification that is sent from the ground power supply device when the power transfer abnormality is detected in the ground power supply device, the power reception control device is configured to determine that there is an abnormality in the power reception device when the number of times the power transfer abnormality has occurred or the number of times the abnormality occurrence notification has been received becomes equal to or greater than a predetermined value, and the power reception control device is configured to: when the power transfer abnormality has occurred, send the abnormality occurrence notification to the ground power supply device including the power transmission device involved in the power transfer abnormality that has occurred with the power reception device; and when a ground-side abnormality notification is received from the ground power supply device to which the abnormality occurrence notification has been sent, decrement the counted number of times the power transfer abnormality has occurred or the counted number of times the abnormality occurrence notification has been received, the ground-side abnormality notification being a notification that there is an abnormality in the power transmission device of the ground power supply device.

8. The moving body according to claim 7, wherein the power reception control device is configured to:

determine whether the power transfer abnormality has occurred.

9. The moving body according to claim 7, wherein the power reception control device is configured to reset the counted number of times the power transfer abnormality has occurred or the counted number of times the abnormality occurrence notification has been received to an initial value when the power reception control device determines that there is an abnormality in the power reception device.

10. The moving body according to claim 7, wherein the power reception control device is configured to determine that there is an abnormality in the power reception device based on power transfer abnormalities that have occurred with a plurality of different ground power supply devices.

11. The moving body according to claim 7, wherein the power reception control device is configured to send a moving body-side abnormality notification to the ground power supply device to which the abnormality occurrence notification has been sent when the power reception control device determines that there is an abnormality in the power reception device, the moving body-side abnormality notification being a notification that there is an abnormality in the power reception device.

12. The moving body according to claim 7, wherein the power reception control device is configured to determine whether the power transfer abnormality has occurred based on a detection signal from a power reception sensor that detects whether electric power is being received normally.

13. An abnormality determination device for a power transmission device of a contactless power supply system, the abnormality determination device comprising:

a storage unit configured to store various computer programs related to the power transmission device;

a power transmission determination unit configured to count the number of times an abnormality related to power transfer has occurred between the power transmission device and a power reception device configured to contactlessly receive electric power transmitted from the power transmission device or the number of times a notification that the abnormality related to the power transfer has occurred has been received from outside, and determine that there is an abnormality in the power transmission device when the counted number of times becomes equal to or greater than a predetermined value based on the various computer programs; and the power transmission determination unit is configured to: when a power transfer abnormality has occurred, send an abnormality occurrence notification to a moving body equipped with the power reception device involved in the power transfer abnormality that has occurred with the power transmission device; and when a moving body-side abnormality notification is received from the moving body to which the abnormality occurrence notification has been sent, decrement the counted number of times the power transfer abnormality has occurred or the counted number of times the abnormality occurrence notification has been received, the moving body-side abnormality notification being a notification that there is an abnormality in the power reception device.

14. The abnormality determination device according to claim 13, wherein the power transmission determination unit is configured to reset the counted number of times the abnormality related to power transfer has occurred or the counted number of times the notification that the abnormality related to the power transfer has occurred has been received to an initial value when the power transmission determination unit determines that there is an abnormality in the power transmission device.

15. The abnormality determination device according to claim 13, wherein the power transmission determination unit is configured to determine that there is an abnormality in the power transmission device based on abnormalities related to power transfer that have occurred with a plurality of different power reception devices.

16. The abnormality determination device according to claim 13, wherein the power transmission determination unit is configured to send a notification that there is an abnormality in the power transmission device to a power reception device to which a notification that the abnormality related to the power transfer has occurred has been sent, when the power transmission determination unit determines that there is an abnormality in the power transmission device.

17. The abnormality determination device according to claim 13, wherein the power transmission determination unit is configured to determine whether the abnormality related to power transfer has occurred based on a detection signal from a power transmission sensor that detects whether electric power is being transmitted normally.

* * * * *